United States Patent
Howland et al.

[11] Patent Number: 6,005,040
[45] Date of Patent: Dec. 21, 1999

[54] PREPARATION AND UTILITY OF WATER-SOLUBLE POLYMERS HAVING PENDANT DERIVATIZED AMIDE, ESTER OR ETHER FUNCTIONALITIES AS CERAMICS DISPERSANTS AND BINDERS

[75] Inventors: Christopher P. Howland, St. Charles; Kevin J. Moeggenborg, Naperville; John D. Morris, Plainfield, all of Ill.; Peter E. Reed, Puyallup, Wash.; Jiansheng Tang, Naperville, Ill.; Jin-Shan Wang, Rochester, N.Y.

[73] Assignee: Nalco Chemical Company, Naperville, Ill.

[21] Appl. No.: 09/186,588

[22] Filed: Nov. 5, 1998

Related U.S. Application Data

[60] Division of application No. 08/982,590, Dec. 4, 1997, Pat. No. 5,880,237, which is a continuation-in-part of application No. 08/792,610, Jan. 31, 1997, Pat. No. 5,726,267.

[51] Int. Cl.⁶ ..................................................... C08K 3/10
[52] U.S. Cl. ........................ 524/406; 524/413; 524/428; 524/430; 526/304
[58] Field of Search ............................ 526/304; 524/406, 524/413, 428, 430

[56] References Cited

U.S. PATENT DOCUMENTS

| | | |
|---|---|---|
| 4,081,418 | 3/1978 | Barua ..................................... 260/29.6 |
| 4,332,657 | 6/1982 | Makuuchi ............................... 526/304 |
| 4,617,321 | 10/1986 | MacDonald .............................. 521/38 |
| 4,680,339 | 7/1987 | Fong . |
| 4,698,384 | 10/1987 | Mao ........................................ 524/458 |
| 4,731,419 | 3/1988 | Fong . |
| 4,885,345 | 12/1989 | Fong . |
| 5,071,933 | 12/1991 | Muller et al. . |
| 5,084,520 | 1/1992 | Fong . |
| 5,182,328 | 1/1993 | Iacoveillo ............................... 524/803 |
| 5,209,885 | 5/1993 | Quadir et al. . |
| 5,252,622 | 10/1993 | DiStefano ................................. 521/65 |
| 5,266,243 | 11/1993 | Kneller et al. . |
| 5,358,911 | 10/1994 | Moeggenborg et al. . |
| 5,360,860 | 11/1994 | Itoh ........................................ 524/460 |
| 5,393,343 | 2/1995 | Darwin et al. . |
| 5,395,907 | 3/1995 | Zajackowski ........................... 526/320 |
| 5,487,855 | 1/1996 | Moeggenborg et al. . |
| 5,525,665 | 6/1996 | Moeggenborg et al. . |
| 5,532,307 | 7/1996 | Bogan . |
| 5,567,353 | 10/1996 | Bogan . |
| 5,700,873 | 12/1997 | Zajackowski ........................... 525/283 |
| 5,837,776 | 11/1998 | Selvarajan .............................. 525/244 |

FOREIGN PATENT DOCUMENTS

| | | |
|---|---|---|
| 05009232 A2 | 1/1993 | Japan . |
| 05070212 A2 | 3/1993 | Japan . |
| 05294712 A2 | 11/1993 | Japan . |
| 06072759 A2 | 3/1994 | Japan . |
| 06313004 A2 | 11/1994 | Japan . |
| 07010943 A2 | 1/1995 | Japan . |
| 07101778 A2 | 4/1995 | Japan . |
| 07133160 A2 | 5/1995 | Japan . |
| 07144970 A2 | 6/1995 | Japan . |

*Primary Examiner*—Paul R. Michl
*Attorney, Agent, or Firm*—Michael B. Martin; Thomas M. Breininger

[57] ABSTRACT

Methods for dispersing and binding ceramic materials in aqueous media are disclosed. The methods utilize water-soluble polymers having pendant derivatized amide, ester or ether functionalities for dispersing and binding various classes of ceramic materials.

12 Claims, No Drawings

PREPARATION AND UTILITY OF WATER-SOLUBLE POLYMERS HAVING PENDANT DERIVATIZED AMIDE, ESTER OR ETHER FUNCTIONALITIES AS CERAMICS DISPERSANTS AND BINDERS

This application is a divisional of Ser. No. 08/982,590, filed Dec. 4, 1997, now U.S. Pat. No. 5,880,237, which is a continuation-in-part of co-pending application Ser. No. 08/792,610, filed Jan. 31, 1997 entitled "Preparation and Utility of Water-Soluble Polymers having Pendant Derivatized Amide, Ester or Ether Functionalities as Ceramics Dispersants and Binders now U.S. Pat. No. 5,726,267."

FIELD OF THE INVENTION

Methods for dispersing and binding ceramic materials in aqueous media are disclosed. The methods utilize water-soluble polymers having pendant derivatized amide, ester or ether functionalities for dispersing and binding various classes of ceramic materials.

BACKGROUND OF THE INVENTION

Ceramic materials are commonly prepared by mixing powdered ceramic oxides such as magnesia, alumina, titania and zirconia, in a slurry along with additives, such as dispersants and binders. The slurry may be spray dried to produce ceramic particles. The particles are pressed into an aggregate structure, called a "green ceramic," having a desired shape and subsequently subjected to a severe heat treatment known as sintering. The sintering process converts the green ceramic into a cohesive "fired ceramic", having a nearly monolithic polycrystalline ceramic phase.

The binder serves to hold the ceramic particles of the green ceramic in the desired shape after pressing. The binder can also provide lubrication while the particles are pressed. Preferably, the binder combusts or vaporizes completely during the sintering process leaving no trace of the binder in the fired ceramic. In performing these functions, binders significantly affect the properties of the fired ceramics which are ultimately produced.

In commercial practice, poly(vinyl alcohols) are widely used as ceramic binders. Additionally, poly(ethylene oxide) and ethylene-vinyl acetate copolymers reportedly have been used as binders for particulate material, such as granular silica gel.

For example, polymeric binders containing substantially hydrolyzed copolymers made from monomers having ester or amide functional groups, poly(vinylformamide) or a copolymer of vinyl alcohol and vinyl amine are disclosed in U.S. Pat. Nos. 5,358,911; 5,487,855 and 5,525,665.

Furthermore, polymeric treatments have been disclosed in U.S. Pat. Nos. 4,680,339; 4,731,419; 4,885,345 and 5,084,520. Utility for the treatments has been disclosed to be as dispersants in water treatment, scale inhibitors in industrial and natural waters, flocculants, coagulants and thickeners; but ceramics applications of binding and dispersancy have not been disclosed.

Although commercially available binders are satisfactory for many applications, a need exists for improved binders which provide still greater strength and/or increased density in green ceramic materials. Greater green strength reduces breakage during handling of the green ceramics and, generally, is associated with higher quality fired ceramics. Preferably, the improved binders would be cheaper and more versatile than previously known binders.

Spray drying is an evaporative process in which liquid is removed from a slurry containing a liquid and a substantially non-volatile solid. The liquid is vaporized by direct contact with a drying medium, usually air, in an extremely short retention time, on the order of about 3 to about 30 seconds. The primary controlling factors in a spray drying process are particle size, particle size distribution, particle shape, slurry density, slurry viscosity, temperature, residence time, and product moisture.

The viscosity of the slurry must be suitable for handling and spray-drying. Although spray-drying equipment conditions may be adjusted to handle a variety of viscosities, larger particles will usually result from higher viscosity slurries.

Those of ordinary skill in the art are familiar with the spray-drying process used in the production of ceramic materials, and will be able to optimize the control factors of spray-drying to best advantage. Alternatively, the spray drying process may be replaced by other well known drying methods, such as granulation, tape casting and slip casting.

Spray drying of the slurry produces substantially dry, free-flowing powder particles which contain the ceramic, the binder and the optional materials described above. The dry particles are granules which are generally spheroidal in shape and have an effective diameter of about 50 to about 300 micrometers. Typically, about 0.5 percent to about 8 percent of the binder, based on the dry weight of the ceramic powder, is present in the dry particles.

In granulation, a mixture of dry powder or powders is mixed or rolled, commonly in a barrel shaped apparatus. Water and/or a binder solution is sprayed into the mixing powder causing aggregation of the small particles into larger granules. The size of the granules is controlled by the amount of material sprayed into the powders and the speed with which it is sprayed. Granulated powders may be screened to a desired size and pressed to shape in a pressing operation prior to sintering. Alternatively, the granules themselves may be the desired product and may be sintered directly.

Tape casting is commonly used to produce thin substrates for the computer industry. In the process, a thick ceramic slurry containing ceramic powder, dispersant and binders is prepared. This slurry is cast onto a smooth surface such as a Mylar or plastic sheet and the thickness is controlled by passing the sheet under a blade which smoothes the slurry surface and scrapes off excess material. The slurry tape is dried to a plastic state and cut and shaped to specification. The amount of binders present in tape casting is very high, typically on the order of 15 to 20 wt. % of the ceramic powder mass.

In fluidized bed spray drying, small "seed" particles are placed in a column and hot air is blown into the seed powder from below suspending the particles in the column. A ceramic slurry is sprayed onto the seed particles from above, causing them to grow. When the particles reach a large enough size, they are siphoned out of the dryer while more seed particles are introduced. This process can produce powder for further forming processes, or the powder itself may represent the desired product, in which case it would be sintered to produce the final ceramic.

The dry particles are compacted to produce an aggregate, green ceramic structure. Preferably, the particles are compacted by pressing in dies having an internal volume which approximates the shape desired for the final fired ceramic product. Alternatively, the particles are compacted by roll compacting or other well-known compacting methods. The spray dried blend of powder, binder, and optional surfactants and lubricants is relatively free flowing so that it can enter and closely conform to the shape of the pressing dies.

Inside the dies, the dry particles are subjected to a pressure which is typically in the range of about 5000 to about 50,000 psi. Pressing the particles produces an aggregate structure, called a green ceramic, which retains its shape after removal from the die.

One forming technique used for spray dried or granulated material is roll compaction, also referred to as roll pressing. This technique takes a dry powder and crushes it between two rollers in a continuous process. This process produces sheets of ceramic of various widths and thicknesses. These sheets can be cut to shape and sintered to produce the final ceramic body. The process is commonly used to produce ceramic substrates for the electronics industry.

Dry pressing involves filling a shaped die with spray dried or granulated powder and pressing it at high pressures. The pressing occurs through movable pistons at the top and/or bottom of the die cavity. The process can be used to produce fairly complex geometries in a single forming step. The ceramic body that results is ejected from the die and sintered to produce a final ceramic product.

Isostatic pressing is similar to dry pressing in that a ceramic powder is pressed in a die cavity. In isostatic pressing, however, all or part of the die wall consists of a flexible material. After filling the die cavity with powder, the die is submerged in a liquid pressure chamber and pressure is applied to squeeze the die and compact the powder. Unlike dry pressing, no movable parts are involved. Isostatic pressing is commonly used on large or very long parts to minimize cracking or lamination of the final ceramic green body.

Extrusion involves the pushing of a concentrated, plastic, slurry through an orifice. The orifice is of the size and shape of the desired ceramic body. This process is commonly used to produce ceramic tubes or similarly shaped pieces. The slurry used is prepared from dry powders which are mixed with water, organic binders and lubricants, and a coagulant. This slurry is usually predried in a filter press or similar apparatus to remove excess water and thicken the slurry to a plastic material. The material is then extruded through a press which is either piston or screw driven. The extruded material is cut to length, dried, and sintered.

Jiggering is commonly used in the whiteware industry to shape an extruded or filter pressed ceramic slurry. Typically, a portion of the plastic slurry is placed on a rotating wheel and shaped by rollers and/or knife blades to a desired geometry. This body is then dried and sintered.

Another ceramic forming method, that is used for parts of complex shape, is slip casting. In slip casting, a concentrated ceramic slurry (slip) is poured into a mold with an internal shape of the desired ceramic body. The slurry used must be highly concentrated to prevent settling of particles and/or excessive shrinkage during drying. At the same time, the slip must be fluid enough to completely fill the mold and allow escape of air bubbles. The presence of a polymeric binder adds strength to the cast body preventing breakage during mold removal and handling of the body prior to sintering.

Heating the aggregate structure drives off volatile materials such as water, and burns off organic materials, such as binders or surfactants. When a sufficiently high temperature is reached, the particles of the aggregate structure begin to fuse, but do not fuse completely, and become fastened to one another to reproduce a relatively strong fired ceramic material having essentially the desired shape.

The slurry is, for example, spray dried to produce substantially dry particles. The particles are preferably pressed to produce an aggregate, green ceramic structure and heated to produce a fired ceramic material. Alternatively, the particles can be formed into an aggregate, green ceramic structure by roll compaction or other well-known methods.

Although commercially available binders are satisfactory for many applications, a need exists for improved binders which provide still greater strength and/or high density in green ceramic materials. Greater green strength reduces breakage during handling of the green ceramics and, generally, is associated with higher quality fired ceramics. Preferably, the improved binders would be cheaper and more versatile than previously known binders.

The present invention also relates to a method for dispersing ceramic materials. In particular, the present invention relates to a method for dispersing one or more ceramic materials in an aqueous medium by using a polymeric dispersant formed from acid-containing monomers and hydroxy functional monomers.

Ceramic materials are often used to prepare lightweight, strong, thermally and chemically resistant products. Because of difficulties associated with the handling of solid ceramic materials, it is desirable for the ceramic materials to be in the form of an aqueous dispersion. Aqueous dispersions of ceramic materials are, however, often unstable, exhibiting sediment formation upon standing. Upon standing, the dispersion agglomerates and becomes non-homogeneous, and creates difficulty in handling. These agglomerates may also damage pipes, pumps, and other dispersion handling mechanical equipment. The use of dispersants overcomes these difficulties, and also improves strength and density of formed ceramic parts, particularly those made by dry press, slip casting, and tape casting processes.

Polymers are known for use as dispersants for ceramic materials. Typical polymeric dispersants for ceramic materials include polymers formed from acid-containing monomers such as, for example, poly(acrylic acid) and poly(methacrylic acid). For example, anionic polymers produced by hydrolyzing a terpolymer of maleic anhydride, N-vinylpyrrolidinone and a vinyl compound selected from the group consisting of acrylic acid, acrylamide, methyl methacrylate and butyl vinyl ether is disclosed in U.S. Pat. No. 5,266,243. Additionally, polymeric dispersants consisting of from 5 to 95 percent by weight of one or more hydroxy functional monomers and from 95% to 5% by weight of one or more acid-containing monomers are disclosed in U.S. Pat. Nos. 5,567,353 and 5,532,307. The hydroxy functional monomer is selected from the group consisting of hydroxypropyl acrylate, hydroxypropyl methacrylate, hydroxyethyl acrylate, hydroxyethyl methacrylate, allyl alcohol, allyloxyethanol, allyl propoxylate, vinyl acetate, 1-butene-3,4-diol and 3-allyloxy-1,2-propane diol.

Furthermore, imidized acrylic polymers have been disclosed for the increase of flowability in cement compositions in U.S. Pat. No. 5,393,343.

While such polymers perform adequately in dispersing some ceramic materials, certain ceramic materials are more difficult to disperse, and conventional polymeric dispersants are not adequate. Ceramic materials which present particular difficulty in forming dispersions include nitrides such as, for example, boron nitride. U.S. Pat. No. 5,209,885 describes dispersing silicon nitride for extrusion by the use of a graft copolymer comprising a polyoxyalkylene backbone with polyacrylate side chains.

The present invention seeks to provide a method for dispersing ceramic material, including several ceramic materials known to be difficult to disperse.

SUMMARY OF THE INVENTION

Methods for dispersing and binding ceramic materials in aqueous media are disclosed. The methods utilize water-soluble polymers having pendant derivatized amide, ester or ether functionalities for dispersing and binding various classes of ceramic materials.

DESCRIPTION OF THE INVENTION

Each of the five classes of polymers described herein may also have utility for mining applications such as dust control and red mud flocculation; for cooling water treatment such as scale and corrosion inhibition, such as for calcium carbonate and calcium phosphonate scale inhibition; for ceramics applications such as green machining and core forming process of gypsum wall board; for the preparation of gypsum slurries, for reverse osmosis system treatment such as desalination scale inhibition, for oilfield applications such as reverse emulsion breakers and barium sulfate and calcium carbonate scale inhibition; for treatment of pulp and paper systems such as scale control, sizing agents, dry strength additives and release agents and as a treatment for solids/liquids separation. Such structures can be used in many applications such as dispersants in water treatment, scale inhibitors in natural and industrial waters, flocculants, coagulants, and thickeners among others.

The present invention relates to polymeric binders for preparing ceramic materials. The method can be used to produce fired ceramic materials from ceramic powders. Suitable powders include but are not limited to: aluminum oxide, silicon nitride, aluminum nitride, silicon carbide, silicon oxide, magnesium oxide, lead oxide, zirconium oxide, titanium oxide and neodymium oxide. Aluminum oxide is presently preferred. The powder can have a weight-averaged median particle size in the range of a few nanometers to about ½ millimeter. Powders having a median size in the range of about 0.5 to about 10 micrometers are preferred.

In one aspect, the ceramic powder is mixed with an aqueous solution containing a polymer to produce a slurry. Preferably, the solution is prepared using deionized water. The slurry may also contain lubricants, plasticizers and surfactants, such as dispersants and anti-foaming agents.

It is also recognized that the properties of a ceramic such as, but not limited to, green density, surface quality or milling characteristics, may be varied as desired by adjusting the ratio of the different monomers in a copolymer, the degree of hydrolysis of a copolymer and the molecular weight of the polymer used in the binder composition.

Several factors may affect the preferred quantity of the polymeric dispersant to be used in forming a dispersion of a ceramic material. Because of the range of ceramic materials that might be used for particular applications, and because different applications may require different solids levels, the amount of dispersant may range from 0.01 percent to 3 percent by weight based on powder mass. For example, the morphology of the ceramic material may affect the optimum level of dispersant. Generally, the more spherical the particles, the less dispersant is required. The surface area of the ceramic material may also affect the optimum quantity of dispersant. The higher the surface area of a ceramic material, generally the more dispersant is required.

The ionic strength (or water hardness) of the dispersion may also affect the optimum level of dispersant. Dispersions having higher ionic strength generally require more dispersant. The ionic strength of the dispersion can be controlled, for example, by using distilled, deionized, partially distilled or partially deionized water, by controlling the level of contaminants introduced into the dispersion by the various components of the dispersion or by adding one or more conventional chelating agents to the dispersion. Preferably, the water hardness of the dispersion which is attributable to multivalent cations is below about 600 parts per million ("ppm") expressed as $Ca^{2+}$, most preferably below about 500 ppm. Generally, the higher the pH of the dispersion, the lower the quantity of dispersant required. For purposes of the present invention, it is preferred that the pH not be below 6. The polymeric dispersant of the present invention works particularly well at a pH of about 8 to 11.

Ceramic materials useful in forming a dispersion according to the method of the present invention include oxide, nitride, and carbide ceramics; in particular: alumina, aluminum nitride, aluminum titanate, lead titanate, boron nitride, silicon, silicon carbide, sialon, zirconium nitride, zirconium carbide, zirconium boride, boron carbide, tungsten carbide, tungsten boride, tin oxide, ruthenium oxide, yttrium oxide, magnesium oxide, calcium oxide, chromic oxide, ferrites, and mixtures thereof among others.

As used herein, "ceramic materials" include ferrites. The ferrites are ferrimagnetic oxides. The classes of ferrites include spinel ferrites, which are oxides having the general formula $MO.Fe_2O_3$, where "M" represents a divalent metal ion or a mixture of ions. Particular examples of spinel ferrites are $Fe_3O_4$ and $NiFe_2O_4$. Another class of ferrites is the orthoferrites, with the general formulas $MFeO_3$, $MCoO_3$, or $MMnO_3$, where M represents La, Ca, Sr, Ba Y, or a rare earth ion. Another class of ferrites is the hexagonal ferrites, with the general formula $AB_{12}O_{19}$, where A is a divalent metal and B is a trivalent metal. Examples of hexagonal ferrites include $PbFe_{12}O_{19}$.

The term clays as used herein denotes materials utilized in whiteware manufacture. Examples are kaolin and ball clay among others.

The polymers described herein for the practice of this invention may range in molecular weight from about 1,000 to about 1,000,000. Preferably, the molecular weight will be from about 5,000 to about 100,000. For the polymers defined herein, the mer units defined by formulas I–IV will range from 5 to 75% of the total number of mer units in the polymer. Preferably, the mer units defined as formulas I–IV will be at least 30% of the total number of mer units in the polymer.

The polymer classes described herein contain amide, ester and ether mer units which are functionalized with pendant groups. These pendant groups confer favorable properties to the polymer for use as a binder for ceramic materials. The polymers may be produced by polymerization using specific monomers, such as might be produced by the copolymerization of acrylic acid with a poly(ethylene glycol) methacrylate comonomer. The polymer so produced would contain a hydrophilic backbone with pendant groups comprised of poly(ethylene glycol). Alternatively, pendant groups could be introduced into the polymer after polymerization. For example, polyacrylic acid could be amidated with an ethoxylated/propoxylated amine, such as those available from Texaco under the trade name Jeffamine series, to produce a polymer with a hydrophilic backbone and ethyleneoxy/propyleneoxy pendant groups. During the amidation process, cyclic imide structures might form between two adjacent carboxylate or carboxamide units on the polymer backbone. These imide structures are not expected to have an adverse effect on the performance of the polymers as a ceramic processing aid.

The invention is a binder for ceramic materials that comprises a water soluble polymer having:

A) a mer unit of the formula

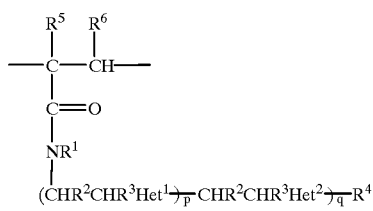

wherein $R^1$ is selected from the group consisting of hydrogen, and $C_1$–$C_3$ alkyl; p and q are integers from 1–10; $R^2$ and $R^3$ are selected from the group consisting of hydrogen and $C_1$–$C_3$ alkyl; $Het^1$ and $Het^2$ selected from the group consisting of O and NH with the proviso that $Het^1$ and $Het^2$ are not both oxygen; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and B) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

As used herein, the monomers described above may be in either their salt or acid forms.

The invention is also an unfired, ceramic precursor material comprising a mixture of.

A. a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, sialon, neodymium oxide and combinations thereof and B. a water soluble polymer having:
i) a mer unit of the formula

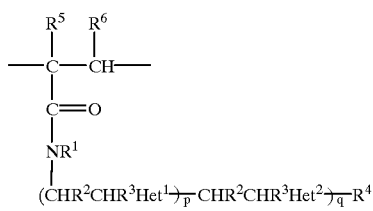

wherein $R^1$ is selected from the group consisting of hydrogen, and $C_1$–$C_3$ alkyl; p and q are integers from 1–10; $R^2$ and $R^3$ are selected from the group consisting of hydrogen and $C_1$–$C_3$ alkyl; $Het^1$ and $Het^2$ selected from the group consisting of O and NH with the proviso that $Het^1$ and $Het^2$ are not both oxygen; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

The invention is also a method for preparing a ceramic material, which comprises the steps of:

A) mixing a ceramic powder with an aqueous solution containing a water-soluble polymer to produce a slurry, said water-soluble polymer having:
i) a mer unit of the formula

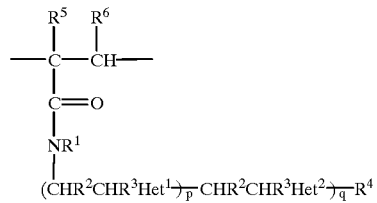

wherein $R^1$ is selected from the group consisting of hydrogen, and $C_1$–$C_3$ alkyl; p and q are integers from 1–10; $R^2$ and $R^3$ are selected from the group consisting of hydrogen and $C_1$–$C_3$ alkyl; $Het^1$ and $Het^2$ selected from the group consisting of O and NH with the proviso that $Het^1$ and $Het^2$ are not both oxygen; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof;

B) drying the slurry by a process selected from the group consisting of fluidized bed spray drying, and spray drying to produce particles which include said copolymer;

C) compacting the particles by a process selected from the group consisting of dry pressing, roll compaction and isostatic pressing to produce an aggregate structure; and D) heating the aggregate structure to produce a fired ceramic material.

Moreover, for the practice of this invention, the particles may be produced by granulation and the step of compacting the particles to produce an aggregate structure may be selected from the group consisting of dry pressing and isostatic pressing.

Alternatively, other methods of making ceramics which are suitable for the purposes of this invention include extrusion, jiggering, tape casting and slip casting.

The invention is a binder for ceramic materials that comprises a water soluble polymer having:

A) a mer unit of the formula

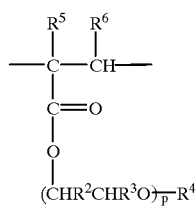

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens, and with the proviso that when p=1, $R^5$ is not methyl; and B) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

As used herein, the monomers described above may be in either their salt or acid forms.

The invention is also an unfired, ceramic precursor material comprising a mixture of:

A. a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, sialon, neodymium oxide and combinations thereof and B. a water soluble polymer having:
   i) a mer unit of the formula

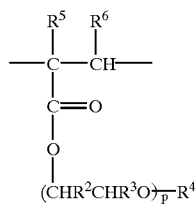

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and R6 as a ring, with the proviso that when p=1, $R^2$, $R^3$, $R^4$, $R^5$ and $R^6$ are not all hydrogens, and with the proviso that when p=1, $R^5$ is not methyl; and ii) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

The invention is also a method for preparing a ceramic material, which comprises the steps of:

A) mixing a ceramic powder with an aqueous solution containing a water-soluble polymer to produce a slurry, said water-soluble polymer having:
   i) a mer unit of the formula

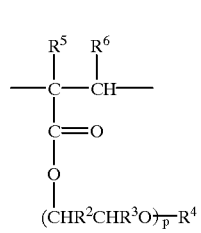

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens, and with the proviso that when p=1, $R^5$ is not methyl; and ii) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof;

B) drying the slurry by a process selected from the group consisting of fluidized bed spray drying, and spray drying to produce particles which include said copolymer;

C) compacting the particles by a process selected from the group consisting of dry pressing, roll compaction and isostatic pressing to produce an aggregate structure; and D) heating the aggregate structure to produce a fired ceramic material.

Moreover, for the practice of this method, the particles may be produced by granulation and the step of compacting the particles to produce an aggregate structure may be selected from the group consisting of dry pressing and isostatic pressing.

Alternatively, other methods of making ceramics which are suitable for the purposes of this invention include extrusion, jiggering, tape casting and slip casting.

The invention is also a method for dispersing one or more ceramic materials in an aqueous medium, comprising utilizing an effective dispersing amount of a polymeric dispersant comprising a water soluble polymer having:

A) a mer unit of the formula

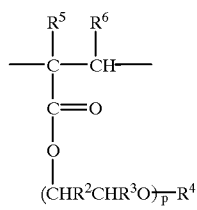

(II)

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens, and with the proviso that when p=1, $R^5$ is not methyl; and B) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

Moreover the one or more ceramic materials may be selected from the group consisting of alumina, aluminum nitride, aluminum titanate, lead titanate, boron nitride, silicon, silicon carbide, sialon, zirconium nitride, zirconium carbide, zirconium boride, boron carbide, tungsten carbide, tungsten boride, tin oxide, ruthenium oxide, yttrium oxide, magnesium oxide, calcium oxide, and ferrites.

Furthermore, the invention is also an aqueous dispersion of ceramic material prepared according to the method above.

The invention is also a binder for ceramic materials that comprises a water soluble polymer having:

A) a mer unit of the formula

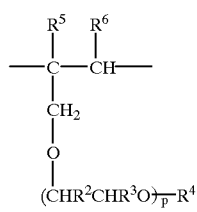

(III)

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens and with the proviso that when p=1, $R^2$ is not methyl and with the proviso that when p=1, $R^3$ is not methyl; and B) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

As used herein, the monomers described above may be in either their salt or acid forms.

The invention is also an unfired, ceramic precursor material comprising a mixture of:

A. a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, sialon, neodymium oxide and combinations thereof and B. a water soluble polymer having:
i) a mer unit of the formula

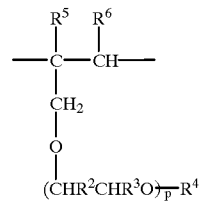

(III)

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens and with the proviso that when p=1, $R^2$ is not methyl and with the proviso that when p=1, $R^3$ is not methyl; and ii) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

The invention is also a method for preparing a ceramic material, which comprises the steps of:

A) mixing a ceramic powder with an aqueous solution containing a water-soluble polymer to produce a slurry, said water-soluble polymer having:

i) a mer unit of the formula

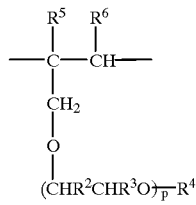

(III)

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R_5$ and $R_6$ as a ring, with the proviso that when p=1, $R^2$, $R^3$, $R^4$, $R^5$ and $R^6$ are not all hydrogens and with the proviso that when p=1, $R^2$ is not methyl and with the proviso that when p=1, $R^3$ is not methyl; and ii) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof;

B) drying the slurry by a process selected from the group consisting of fluidized bed spray drying, and spray drying to produce particles which include said copolymer;

C) compacting the particles by a process selected from the group consisting of dry pressing, roll compaction and isostatic pressing to produce an aggregate structure; and D) heating the aggregate structure to produce a fired ceramic material.

Moreover, for the practice of this invention, the particles may be produced by granulation and the step of compacting the particles to produce an aggregate structure may be selected from the group consisting of dry pressing and isostatic pressing.

Alternatively, other methods of making ceramics which are suitable for the purposes of this invention include extrusion, jiggering, tape casting and slip casting.

The invention is also a method for dispersing one or more ceramic materials in an aqueous medium, comprising utilizing an effective dispersing amount of a polymeric dispersant comprising a water soluble polymer having:

A) a mer unit of the formula

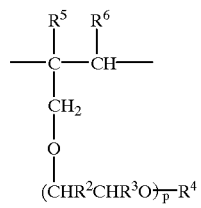

(III)

wherein p is an integer from 1–10; $R^2$ and $R^3$ are selected from the group consisting of hydrogen and $C_1$–$C_3$ alkyl; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring, with the proviso that when p=1, $R^2$, $R^3$, $R^4$, $R^5$ and $R^6$ are not all hydrogens and with the proviso that when p=1, $R^2$ is not methyl and with the proviso that when p=1, $R^3$ is not methyl; and B) a water-soluble mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, N-vinyl pyrrolidone, maleic acid, and combinations thereof.

Furthermore, the one or more ceramic materials may be selected from the group consisting of alumina, aluminum nitride, aluminum titanate, lead titanate, boron nitride, silicon, silicon carbide, sialon, zirconium nitride, zirconium carbide, zirconium boride, boron carbide, tungsten carbide, tungsten boride, tin oxide, ruthenium oxide, yttrium oxide, magnesium oxide, calcium oxide, and ferrites.

The invention is also an aqueous dispersion of ceramic material prepared according to the method described above.

The invention is also a binder for ceramic materials that comprises a water-soluble polymer having:

A) a mer unit of the formula

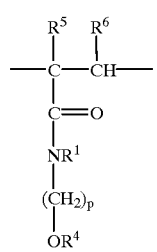

(IV)

wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and B) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

As used herein, the monomers described above may be in either their salt or acid forms.

Preferably, the binder is of a structure wherein p=2; $R^1$, $R^4$, $R^5$, and $R^6$ are hydrogen in formula IV of step A; and the mer units of step B are acrylic acid and acrylamide.

Additionally, the binder may be of a structure wherein p=3; $R^5$, $R^6$, and $R^1$ are hydrogen; $R^4$ is methyl in formula IV of step A; and the mer units of step B are acrylic acid and acrylamide.

Moreover, for the practice of this invention, mer units of general structure IV with polyoxy N-pendant groups may also be effective, as well as the alkyloxy groups described above. For example multihydroxy N-pendant groups such as those alkyl derivatives having dihydroxy and trihydroxy, as well as alkyl derivatives containing diether and triether moieties may also be effective.

The invention is also an unfired, ceramic precursor material comprising a mixture of:

A) a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, sialon, neodymium oxide and combinations thereof and B) a water-soluble polymer having:
  i) a mer unit of the formula

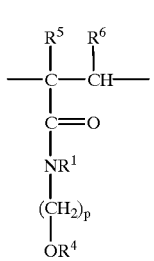

IV wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

Preferably, the water-soluble polymer of the method described above has a structure wherein p=2; $R^1$, $R^4$, $R^5$, and $R^6$ are hydrogen for formula IV of step i; and the mer units of step ii are acrylic acid and acrylamide.

Alternatively, the water-soluble polymer of the method described above has a structure wherein p=3; $R^5$, $R^6$, and $R^1$ are hydrogen; $R^4$ is methyl for formula IV of step i and the mer units of step ii are acrylic acid and acrylamide.

The invention is also a method for preparing a ceramic material, which comprises the steps of:

A) mixing a ceramic powder with an aqueous solution containing a water-soluble polymer to produce a slurry, said water-soluble polymer having:
  i) a mer unit of the formula

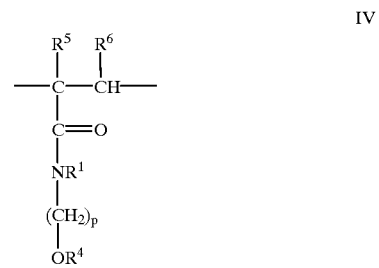

IV wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof;

B) drying the slurry by a process selected from the group consisting of fluidized bed spray drying, and spray drying to produce particles which include said copolymer;

C) compacting the particles by a process selected from the group consisting of dry pressing, roll compaction and isostatic pressing to produce an aggregate structure; and D) heating the aggregate structure to produce a fired ceramic material.

Preferably, the water-soluble polymer of the method described above has a structure wherein p=2; $R^1$, $R^4$, $R^5$, and $R^6$ are hydrogen for formula IV of step I and the mer units of step ii are acrylic acid and acrylamide.

Alternatively, the water-soluble polymer of the method described above has a structure wherein p=3; $R^5$, $R^6$, and $R^1$ are hydrogen; $R^4$ is methyl for formula IV of step i and the mer units of step ii are acrylic acid and acrylamide.

Furthermore, in the method described above, the particles may be produced by granulation and the step of compacting the particles to produce an aggregate structure may be selected from the group consisting of dry pressing and isostatic pressing.

Alternatively, other methods of making ceramics which are suitable for the purposes of this invention include extrusion, jiggering, tape casting and slip casting.

The invention is also a method for dispersing one or more ceramic materials in an aqueous medium, comprising utilizing an effective dispersing amount of a polymeric dispersant comprising a water-soluble polymer having:

A) a mer unit of the formula

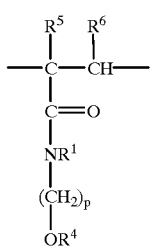

IV wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and B) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

Preferably, the water-soluble polymer of the method described above has a structure wherein p=2; $R^1$, $R^4$, $R^5$, and $R^6$ are hydrogen for formula IV of step A; and the mer units of step B are acrylic acid and acrylamide.

Alternatively, the water-soluble polymer of the method described above has a structure wherein p=3; $R^5$, $R^6$, and $R^1$ are hydrogen; $R^4$ is methyl for formula IV of step A; and the mer units of step B are acrylic acid and acrylamide.

For the practice of this invention, the one or more ceramic materials may be selected from the group consisting of alumina, aluminum nitride, aluminum titanate, lead titanate, boron nitride, silicon, silicon carbide, sialon, zirconium nitride, zirconium carbide, zirconium boride, boron carbide, tungsten carbide, tungsten boride, tin oxide, ruthenium oxide, yttrium oxide, magnesium oxide, calcium oxide, and ferrites.

Moreover, the method may include an aqueous dispersion of ceramic material.

The following examples are presented to describe preferred embodiments and utilities of the invention and are not meant to limit the invention unless otherwise stated in the claims appended hereto.

EXAMPLE 1

The synthesis of an ammonium acrylate/N-(hydroxyethoxy)ethyl acrylamide copolymer was effected with the following reactants in the following amounts:

| Reactant | Amount (g) |
| --- | --- |
| Poly(AA), 25.6 weight % in water | 100.00 |
| Aminoethoxyethanol | 11.92 |
| Ammonium Hydroxide, 29 weight % | 2.51 |

To prepare the polymer, poly(AA) (25.6 weight percent poly(acrylic acid) solution, pH=3.8, 16,000 MW) was placed in a beaker, which was cooled using an ice bath. Aminoethoxyethanol (available from Huntsman Petrochemical Co., in Houston, Tex.) was added dropwise into the poly(acrylic acid)/water solution with vigorous stirring. Afterwards, the solution was stirred for another 15 minutes. The pH of the reaction mixture was measured using water-wet pH strips. Aqueous caustic was added to adjust the pH to about 5. Next, the reaction mixture was transferred into a 300 mL Parr reactor with a pressure rating of at least 800 psi. The reactor then was assembled and purged with nitrogen for 60 minutes. The Parr reactor was then slowly heated to 160° C. (or less, as the case may be) and held at that temperature for 8 hours (or more, as the case may be). Afterwards, the reactor was cooled to room temperature and the pressure released. The product was then transferred to storage.

$^{13}$C NMR confirmed product formation. The content of N-(hydroxyethoxy)ethyl acrylamide was 21 mole %, based on the total moles of mer units on the polymer, which represents both secondary amide and imide mer units. The polymer's molecular weight was 24,000.

EXAMPLE 2

The synthesis of an ammonium acrylate/acrylamide/N-(hydroxyethoxy)ethyl acrylamide terpolymer was effected in the following manner with the reactants in the amounts listed below:

| Reactant | Amount (g) |
| --- | --- |
| Poly(NH$_4$AA/AcAm), 50/50 mol % solution polymer, 38.2 weight % | 300.00 |
| Aminoethoxyethanol | 114.00 |

To prepare the polymer, Poly(NH$_4$AA/AcAm) (50/50 mol % ammonium acrylate/acrylamide copolymer, 38.2 weight percent, pH=5.5, 33,000 MW) was placed in a beaker, which was cooled using an ice bath. Aminoethoxyethanol (available from Huntsman Petrochemical Co., in Houston, Tex.) was added dropwise into the above water solution with vigorous stirring (pH=10. 1). Afterwards, the solution was stirred for another 15 minutes. The pH of the reaction mixture was measured using water-wet pH strips. Next, the reaction mixture was transferred into a 600 mL Parr reactor with a pressure rating of at least 800 psi. The reactor then was assembled and purged with nitrogen for 60 minutes. The Parr reactor was then slowly heated to 138° C. and held at that temperature for 14 hours. Afterwards, the reactor was cooled to room temperature and the pressure released. The product was then transferred to storage.

$^{13}$C NMR confirmed product formation. The content of N-(hydroxyethoxy)ethyl acrylamide was 33.3 mole %, based on the total moles of mer units on the polymer. The polymer had a molecular weight of 35,000, and a mole ratio of N-(hydroxyethoxy)ethyl acrylamide/acrylic acid/ acrylamide of 33/41/26.

EXAMPLE 3

The synthesis of a sodium acrylate/acrylamide/N-(hydroxyethoxy)ethyl acrylamide terpolymer was effected in the following manner with the reactants in the amounts listed below:

| Reactant | Amount (g) |
| --- | --- |
| Poly(NaAA/AcAm), 50/50 mol % solution polymer, 32.0 weight % | 100.00 |
| Aminoethoxyethanol | 32.00 |
| Sulfuric Acid (95%) | 11.5 |

To prepare the polymer, Poly(NaAA/AcAm) (50/50 mol % sodium acrylate/acrylamide copolymer, 32.0 weight %, pH=5.2, 11,000 MW) was placed in a beaker, which was cooled using an ice bath. Aminoethoxyethanol (available from Huntsman Petrochemical Co., in Houston, Tex.) was added dropwise into the above water solution with vigorous stirring. Afterwards, the solution was stirred for another 15 minutes. The pH of the reaction mixture was measured using water-wet pH strips. Sulfiric acid was added to adjust the pH to about 5.6. Next, the reaction mixture was transferred into a 300 mL Parr reactor with a pressure rating of at least 800 psi. The reactor then was assembled and purged with nitrogen for 60 minutes. The Parr reactor was then slowly heated to 138° C. and held at that temperature for 12 hours. Afterwards, the reactor was cooled to room temperature and the pressure released. The product was then transferred to storage.

$^{13}$C NMR confirmed product formation. The content of N-(hydroxyethoxy)ethyl acrylamide was 33 mole %, based on the total moles of mer units on the polymer. The mole ratio was 42/22/33 of acrylic acid/acrylamide(including 3% imide mer units)/N-(hydroxyethoxy)ethyl acrylamide (including imide mer units). The product polymer had a molecular weight of 12,000.

EXAMPLE 4

The synthesis of a sodium acrylate/acrylamide/N-Methoxypropyl acrylamide terpolymer was effected in the following manner with the reactants in the amounts listed below:

| Reactant | Amount(g) |
| --- | --- |
| Poly(NaAA/AcAm), 50/50 mol % solution polymer, 32.0 weight % | 100.00 |
| Methoxypropylamine | 23.32 |
| Sulfuric Acid (95%) | 11.23 |

To prepare the polymer, Poly(NaAA/AcAm) (50/50 mol %, 32.0 weight %, pH=5.2, 11,000 MW) was placed in a beaker, which was cooled using an ice bath. Methoxypropylamine (available from Aldrich Chem. Co., in Milwaukee, Wis.) was added dropwise into the above water solution with vigorous stirring. Afterwards, the solution was stirred for another 15 minutes. The pH of the reaction mixture was measured using water-wet pH strips. Sulfuric acid was added to adjust the pH to about 5.6. Next, the reaction mixture was transferred into a 300 mL Parr reactor with a pressure rating of at least 800 psi. The reactor then was assembled and purged with nitrogen for 60 minutes. The Parr reactor was then slowly heated to 138° C. and held at that temperature for 12 hours. Afterwards, the reactor was cooled to room temperature and the pressure released. The product was then transferred to storage.

$^{13}$C NMR confirmed product formation. The content of methoxypropyl acrylamide was 34.2 mole %, based on the total moles of mer units on the polymer. The mole ratio of the product was 41/17/34 which represents acrylic acid/acrylamide (including 6% imide mer units)/methoxypropyl acrylamide (including imide mer units). The product's molecular weight was 11,000.

EXAMPLE 5

The synthesis of a sodium acrylate/acrylamide/N-hydroxy(ethylamino)ethyl acrylamide terpolymer was effected in the following manner with the reactants in the amounts listed below:

| Reactant | Amount(g) |
| --- | --- |
| Poly(NaAA/AcAm), 50/50 mol % solution polymer, 24.0 weight % | 80.00 |
| (Aminoethylamine)ethanol | 19.02 |
| Sulfuric Acid (95%) | 12.23 |

To prepare the polymer, Poly(NaAA/AcAm) (50/50 mol %, 24.0 weight %, pH=3.5, 15,000 MW) was placed in a beaker, which was cooled using an ice bath. (Aminoethylamino)ethanol (available from Aldrich Chem. Co., in Milwaukee, Wis.) was added dropwise into the above water solution with vigorous stirring. Afterwards, the solution was stirred for another 15 minutes. The pH of the reaction mixture was measured using water-wet pH strips. Sulfuric acid was added to adjust the pH to about 5.6. Next, the reaction mixture was transferred into a 300 mL Parr reactor with a pressure rating of at least 800 psi. The reactor then was assembled and purged with nitrogen for 60 minutes. The Parr reactor was then slowly heated to 138° C. and held at that temperature for 14 hours. Afterwards, the reactor was cooled to room temperature and the pressure released. The product was then transferred to storage.

$^{13}$C NMR confirmed product formation. The content of hydroxy(ethylamino) ethyl acrylamide was 46 mole %, based on the total moles of mer units on the polymer, representing both secondary amide and imide mer units. The polymer also contained 51% of acrylic acid units. The product polymer's molecular weight was 15,000.

EXAMPLE 6

The synthesis of an acrylic acid/acrylamide/N-(hydroxyethoxy)ethyl acrylamide terpolymer was effected in the following manner with the reactants in the amounts listed below:

| Reactant | Amount(g) |
| --- | --- |
| Poly(AcAm), 50 weight % | 50.00 |
| Aminoethoxyethanol | 12.9 |
| Deionized water | 50.0 |
| Sulfuric Acid (95%) | 6.1 |

To prepare the polymer, Poly(AcAm) (50 wt %, available from Aldrich Chemical Co., 10,000 MW) was placed in a beaker, which was cooled using an ice bath. Aminoethoxyethanol (available from Huntsman Petrochemical Co., in Houston, Tex.) was added dropwise into the above water solution with vigorous stirring. Afterwards, the solution was stirred for another 15 minutes. The pH of the reaction mixture was measured using water-wet pH strips. Sulfuric acid was added to adjust the pH to about 5.6. Next, the reaction mixture was transferred into a 300 mL Parr reactor with a pressure rating of at least 800 psi. The reactor then was assembled and purged with nitrogen for 60 minutes. The Parr reactor was then slowly heated to 138° C. and held at that temperature for 14 hr. Afterwards, the reactor was cooled to room temperature and the pressure released. The product was then transferred to storage.

$^3$C NMR confirmed product formation. The content of N-(hydroxyethoxy) ethyl acrylamide was 19.6 mole %, based on the total moles of mer units on the polymer. The product's mole ratio was 32/44/20 which represents acrylic acid/acrylamide/N-(hydroxyethoxy)ethyl acrylamide.

EXAMPLE 7

The synthesis of a 33/50/17 mole percent acrylic acid/acrylamide/N-(hydroxyethyl) acrylamide terpolymer was effected in the following manner. To 100 g of a 52/48 mole ratio AA/AcAm copolymer (42.7% polymer actives, weight average molecular weight=34,100) in a Parr reactor was added 17.4 g of ethanolamine. The pH was adjusted with 8.32 g of 36% hydrochloric acid to between 5.0 to 5.5. The solution was purged with nitrogen for 1.0 hour and heated at 138–142° C. for about 8 hours. NMR analysis results indicated the terpolymer composition was 38/52/10 N-(hydroxyethyl) acrylamide/AA/AcAm. The weight average molecular weight of the product was 128,000, indicating the polymer was lightly crosslinked. To the stirred half amount of the product was added dropwise 50% NaOH solution (19.24 g) at pH<11.39. The solution was further stirred for 3.5 hours at room temperature. The pH was adjusted to about 7 with 36% hydrochloric acid. The weight average molecular weight was 42,600. NMR analysis results showed this product was a terpolymer of 33/50/17 N-(hydroxyethyl)acrylamide/AA/Am.

EXAMPLE 8

The synthesis of a 35/51/14 mole percent N-(hydroxyethyl) acrylamide/acrylic acid/acrylamide terpolymer was effected in the following manner. To 100 g of a 52/48 AA/Am copolymer (42.7% polymer actives, weight average molecular weight 34,100) in a Parr reactor was added 25.3 g. of ethanolamine. The pH was adjusted with 18.8 g of 36% hydrochloric acid to about 5.3. The solution was purged with nitrogen for 1.0 hour and heated at 136–138° C. for about 7 hours. 37.0 g of 50% NaOH was added dropwise to the stirred solution at pH<12 and at room temperature. After the solution was stirred for further 5 hours, the pH was adjusted with 36% hydrochloric acid to 8.5. NMR analysis results indicated the terpolymer composition was 35/51/14 N-(hydroxyethyl) acrylamide/AA/Am. The weight average molecular weight of the terpolymer was 31,000.

EXAMPLE 9

To determine the dispersancy of the polymers, the following experimental procedure was followed. 1500 g slips were prepared to 80 weight percent alumina powder (99.5% calcinated alpha alumina oxide available from Alcan, C90 LSB Alumina) in water using 0.25 weight percent (polymer/powder) of the polymer to be tested.

Each slip was milled 3 hours in a 1-liter jar mill using 1500 g milling media. Then, resulting slips were filtered through a 60 mesh screen, and Brookfield viscosity was measured using an LVT type viscometer using a #2 spindle. For comparison purposes, a commercially available, common alumina additive polymer was utilized. Polymer B is an ammonium poly(methacrylate) available from R.T. Vanderbilt Co., Norwalk, Conn. Polymer A is a polymer synthesized according to the procedure of Example 2.

The viscosity of a slurry must be suitable for necessary handling and spray drying. Although spray dry equipment and running conditions may be adjusted to handle a variety of viscosities, larger particles will result from higher viscosity slurries. The resultant large particles may lead to larger interstices between particles and hence a lower strength. The binder may contribute to viscosity of the continuous phase of the slurry by virtue of its molecular weight, solubility, conformation in solution, and possible incompatibility with the combination of powder and dispersant. Since a lower viscosity is more desirable for ceramic applications, the results of Table I show that a polymer of this invention, prepared in accordance with the procedure of Example 2, works better than the common treatment.

TABLE I

Dispersancy in Alumina

| | Brookfield Viscosity (cP) | | | |
|---|---|---|---|---|
| Polymer | 6 rpm | 12 rpm | 30 rpm | 60 rpm |
| A | 100 | 88 | 70 | 65 |
| B | 300 | 225 | 160 | 105 |

EXAMPLE 10

The polymers were also tested in order to determine the effects of slip viscosity as a function of binder type, according to the following procedure. Deflocculated slips were prepared as in the procedure of Example 9. To each slip so prepared, the polymeric treatment to be tested was added, to be a total of 4.0 weight percent (polymer/powder) level. Next, each binder-containing slip was propeller mixed at 800 rpm for one hour. For any necessary dilution, deionized water was added to attain the tabulated powder solids level. Finally, the slip viscosity was measured using the method described in Example 9.

The results of Table II illustrate that even though the binder composition was varied, the polymers of this invention caused lower viscosity of the slip than the current commercially available polymer treatment. In Table II, Polymer C is a poly(vinyl alcohol) which has a molecular weight of 30,000 to 50,000 and is 88% hydrolyzed. It is available from Air Products of Allentown, Pa. Polymer A is a polymer synthesized according to the procedure in Example 2. For each polymer tested, 4 weight percent was utilized, and the viscosity was measured at 3.14 sec$^{-1}$.

TABLE II

Slip Viscosity as a Function of Binder Type

| Slip Powder Solids Weight Percent | Polymer C Slip BFV[1] (cP) | Polymer A Slip BFV[1] (cP) |
|---|---|---|
| 76.4 | >10,000 | 440 |
| 74.8 | 8,200 | 170 |
| 72 | 840 | 20 |
| 70 | 360 | — |

[1]Brookfield viscosity

EXAMPLE 11

A copolymer synthesized by the procedure described in Example 2 above, was tested as a binder for alumina particles of the type that are commonly used for producing ceramic materials.

The slip preparation described in Example 10 was utilized in this Example to further examine the characteristics of the binders.

The milled slurry was spray dried in a Yamato DL41 laboratory spray dryer. Dryer operating conditions were: 250° C. air inlet temperature, atomizing air setting of 1.2, slurry feed pump setting of 5, and drying air feed rate of 0.7 cubic meters per minute. A dry powder was produced which was recovered, screened and stored overnight in a 20 percent relative humidity chamber.

The screened powder was pressed into nine pellets in a Carver laboratory press, three at 5,000 pounds per square inch pressing force, three at 15,000 pounds per square inch pressing force, and three at 25,000 pounds per square inch pressing force. The pellets were approximately 28.7 millimeters in diameter and 5 to 6 millimeters in height. The dimensions and weights of the pellets were measured and the pellets were crushed to determine the force required to break them. Diametral compression strength (DCS) for each of the pellets was determined from the breaking force and the pellet dimensions. The average diametral compression strength in megapascals for each set of three pellets is presented below in Table III.

Green body diametral compressional strength is important in ceramics applications for the following reasons. The principal function of the binder is to hold the compacted form together after pressing. The method utilized for determination of suitable "green strength" is the diametral compression strength or DCS of a cylindrical section across its diameter. DCS is actually a measure of tensile strength. The unit of measurement of pressure tolerance is the megapascal (Mpa). Typical values for DCS of "green" parts are in the range of 0.3–3.0 Mpa. Polymer A is a polymer prepared according to the procedure in Example 2. Polymer C is the conventional additive described in Example 10. Therefore, since a higher DCS value indicates a more efficient binder, Table III shows that the polymers of the instant invention are more efficient than a conventional treatment. D is another additive that is often used in conjunction with these polymeric treatments for ceramic applications.

Since a greater density is more desirable, the results of Table III illustrate that the polymers of the instant invention are more advantageous in this respect also, as indicated by the higher numbers obtained than in the case of the conventional treatment.

The springback characteristic is another important measure of the efficiency of a polymer for ceramics applications for the following reasons. Upon filling a die, the resulting compacted part must be smoothly ejected, be as dense as possible, and not suffer significant dimensional change from that of the die. Chemical additives have a major effect on the desired lubricity. The compressed powder will undergo stress relaxation in the form of expansion on release from the die. This phenomenon is referred to as "springback" and is undesirable from the standpoint of dimensional accuracy as well as density and strength. For this example, D was used as a plasticizer. Maintenance of net shape is important, as the occurrence of a larger amount of springback can cause lamination defects, or undesirable density gradients. Therefore, the lower values for springback obtained for the polymers of this invention in Table III demonstrate that such polymers are more efficient than the conventional treatment.

The pressure required for die ejection was also measured. The same test equipment was utilized as described above, except that after the pellet is pressed, a plunger on the bottom of the apparatus is utilized to apply force to the die. A lower pressure is more desirable, and was obtained by the use of polymers of the instant invention over polymers conventionally utilized for ceramic purposes.

TABLE III

Comparison of Green Body Properties

| Pressure (PS) | Polymeric Treatment | | | | | |
|---|---|---|---|---|---|---|
| | A | C | A + $D^1$ | C + $D^1$ | A + $D^2$ | C + $D^2$ |
| Green Body Diametrial Compressional Strength (MPa) | | | | | | |
| 5,000 | 0.64 | 0.20 | 0.55 | 0.45 | 0.45 | 0.38 |
| 15,000 | 1.76 | 0.98 | 1.24 | 1.01 | 1.04 | 0.79 |
| 25,000 | 2.42 | 1.19 | 1.79 | 1.30 | 1.31 | 0.91 |
| Pellet Green Density (g/cc) | | | | | | |
| 5,000 | 2.28 | 2.09 | 2.30 | 2.23 | 2.33 | 2.34 |
| 15,000 | 2.52 | 2.38 | 2.51 | 2.43 | 2.54 | 2.50 |
| 25,000 | 2.60 | 2.43 | 2.61 | 2.51 | 2.60 | 2.57 |
| Percent Springback in Green Bodies | | | | | | |
| 5,000 | 0.06 | 0.22 | −0.02 | 0.19 | 0.11 | 0.12 |
| 15,000 | 0.11 | 0.22 | 0.12 | 0.19 | 0.14 | 0.18 |
| 25,000 | 0.16 | 0.23 | 0.14 | 0.19 | 0.15 | 0.18 |
| Pressure Required for Die Ejection (PSI) | | | | | | |
| 5,000 | 0.00 | 7.93 | 0.96 | 29.16 | 7.46 | 22.47 |
| 15,000 | 19.86 | 49.37 | 26.57 | 73.94 | 39.08 | 64.57 |
| 25,000 | 41.30 | 77.87 | 42.12 | 101.14 | 59.48 | 92.00 |

$D^1$ = poly(ethylene oxide/propylene oxide) ether linked to (1,2-ethandiyldintrilo) tetrakis [propanol], 0.8 weight percent
$D^2$ = as $D^1$ above, 3.0 weight percent

EXAMPLE 12

The procedures utilized in Example 11 were utilized to obtain the results of Table IV. Rather than utilize a range of pressures as in the previous example, the characteristics were evaluated at a single density. The pressure which was required to produce that density was recorded in the table. The polymers A, C and D are as defined in Example 11 above. Even when measured at pellets pressed to a constant density, the polymers of the instant invention provide superior performance over the conventional polymeric treatment.

TABLE IV

Comparative Green Body Properties at Green Density 2.4 g/mL

| Polymeric Treatment | Press Pressure Required (PSI) | DCS (MPa) | % Springback | Ejection Force (psi) |
|---|---|---|---|---|
| A | 10,000 | 1.22 | 0.08 | 10 |
| C | 19,200 | 1.1 | 0.23 | 63 |
| A + $D^1$ | 9,700 | 0.94 | 0.04 | 13 |
| C + $D^1$ | 13,300 | 0.88 | 0.19 | 67 |
| A + $D^2$ | 8,200 | 0.65 | 0.12 | 18 |
| A + $D^2$ | 8,800 | 0.56 | 0.14 | 39 |

$D^1$ = poly(ethylene oxide/propylene oxide) ether linked to (1,2-ethandiyldintrilo) tetrakis [propanol], 0.8 weight percent
$D^2$ = as $D^1$ above, 3.0 weight percent Changes can be made in the composition, operation and arrangement of the method of the present invention described herein without departing from the concept and scope of the invention as defined in the following claims:

We claim:

1. An unfired, ceramic precursor material comprising a mixture of:

A) a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, sialon, neodymium oxide and combinations thereof and B) a water-soluble polymer having:
   i) a mer unit of the formula

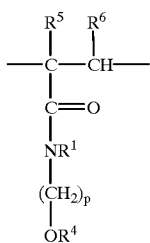

IV wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) one or more mer units selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone and maleic acid.

2. The unfired, ceramic precursor material of claim 1 wherein p=2; $R^1$, $R^4$, $R^5$, and $R^6$ are hydrogen for formula IV of step i; and the mer units of step ii are acrylic acid and acrylamide.

3. The unfired, ceramic precursor material of claim 1 wherein p=3; $R^5$, $R^6$, and $R^1$ are hydrogen; $R^4$ is methyl for formula IV of step i and the mer units of step ii are acrylic acid and acrylamide.

4. A method for preparing a ceramic material, which comprises the steps of:

A) mixing a ceramic powder with an aqueous solution containing a water-soluble polymer to produce a slurry, said water-soluble polymer having:

i) a mer unit of the formula

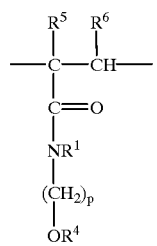

IV wherein $R^1$ is selected from the group consisting of hydrogen, and $C_1$–$C_3$ alkyl; p is an integer from 1–10; $R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and ii) one or more mer units selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone and maleic acid;

B) drying the slurry by a process selected from the group consisting of fluidized bed spray drying and spray drying to produce particles which include said copolymer;

C) compacting the particles by a process selected from the group consisting of dry pressing, roll compaction, isostatic pressing to produce an aggregate structure; and D) heating the aggregate structure to produce a fired ceramic material.

5. The method of claim 4 wherein p=2; $R^1$, $R^4$, $R^5$, and $R^6$ are hydrogen for formula IV of step i and the mer units of step ii are acrylic acid and acrylamide.

6. The method of claim 4 wherein p=3; $R^5$, $R^6$, and $R^1$ are hydrogen; $R^4$ is methyl for formula IV of step i and the mer units of step ii are acrylic acid and acrylamide.

7. The method of claim 4 wherein the particles are produced by granulation and the step of compacting the particles to produce an aggregate structure is selected from the group consisting of dry pressing and isostatic pressing.

8. A method for dispersing one or more ceramic materials in an aqueous medium, comprising utilizing an effective dispersing amount of a polymeric dispersant comprising a water-soluble polymer having:

A) a mer unit of the formula

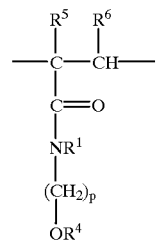

IV wherein $R^1$ is selected from the group consisting of hydrogen, and $C_1$–$C_3$ alkyl; p is an integer from 1–10;

$R^4$ is selected from the group consisting of hydrogen, phosphate, sulfate and $C_1$–$C_{20}$ alkyl; $R^5$ and $R^6$ are selected from the group consisting of hydrogen, carboxylate, $C_1$–$C_3$ alkyl, and a cycloalkyl group of 1 to 6 carbon atoms formed by the linkage of $R^5$ and $R^6$ as a ring; and B) a mer unit selected from the group consisting of acrylic acid, methacrylic acid, acrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

9. The method of claim 8 wherein p=2; $R^1$, $R^4$, $R^5$, and $R^6$ are hydrogen for formula IV of step A; and the mer units of step B are acrylic acid and acrylamide.

10. The method of claim 8 wherein p=3; $R^5$, $R^6$, and $R^1$ are hydrogen; $R^4$ is methyl for formula IV of step A; and the mer units of step B are acrylic acid and acrylamide.

11. The method of claim 8 wherein the one or more ceramic materials is selected from the group consisting of alumina, aluminum nitride, aluminum titanate, lead titanate, boron nitride, silicon, silicon carbide, sialon, zirconium nitride, zirconium carbide, zirconium boride, boron carbide, tungsten carbide, tungsten boride, tin oxide, ruthenium oxide, yttrium oxide, magnesium oxide, calcium oxide, and ferrites.

12. An aqueous dispersion of ceramic material prepared according to the method of claim 8.

* * * * *